No. 665,822. Patented Jan. 8, 1901.
W. A. BARROWS.
TIRE.
(Application filed Oct. 11, 1900.)
(No Model.)
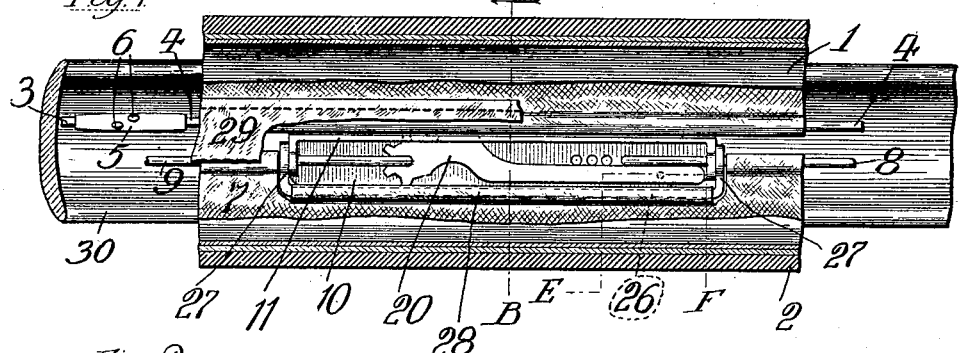
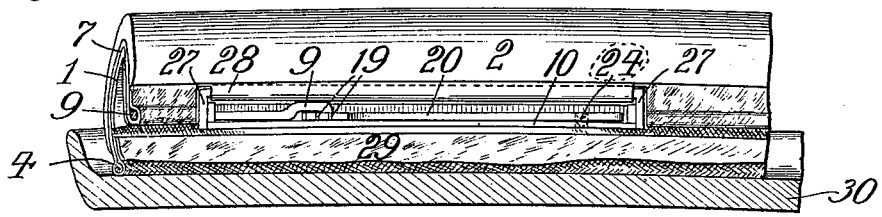
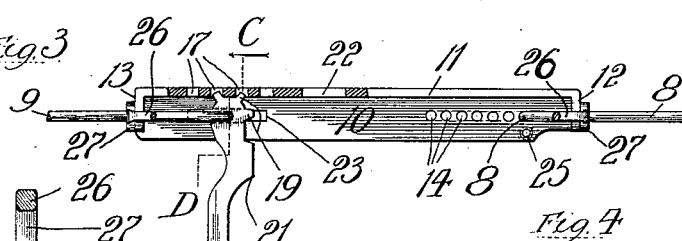
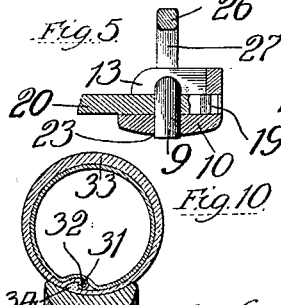
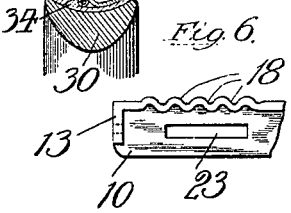
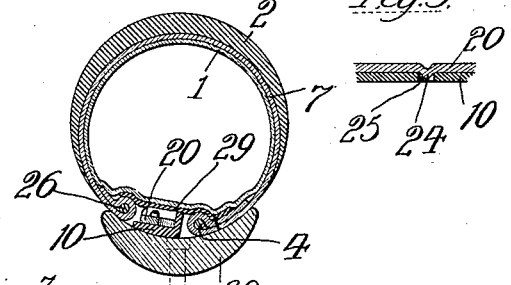
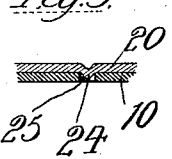
Witnesses:
Lute J. Alter
George R. Harbaugh
Inventor:
Walter A. Barrows.
By Coburn, Hibben & McElroy
Attys.

UNITED STATES PATENT OFFICE.

WALTER A. BARROWS, OF CHICAGO, ILLINOIS.

TIRE.

SPECIFICATION forming part of Letters Patent No. 665,822, dated January 8, 1901.

Application filed October 11, 1900. Serial No. 32,713. (No model.)

*To all whom it may concern:*

Be it known that I, WALTER A. BARROWS, a resident of Chicago, in the county of Cook and State of Illinois, have invented certain new and useful Improvements in Tires, of which the following is a specification.

My invention pertains to mechanical means for attaching and detaching a pneumatic tire to its rim; and its object is to provide simple, efficient, and reliable means for this purpose.

My invention is applicable to those tires having a wire in one or both of its edges, and my device is used for the purpose of connecting and tightening the free ends of the wire. In general terms my device is a wire tightener or connector comprising a plate to which one end of the wire is secured, adjustably or otherwise, and on which is mounted a walking-lever, to which the other end of the wire is connected. I have also devised what I will term a "bail," to be used in connection with said connector or other form of connectors.

In the drawings, Figure 1 is a sectional plan of a portion of a pneumatic tire and rim, showing my device; Fig. 2, a side elevation thereof, showing the outer casing and the bail thrown back; Fig. 3, a sectional plan of my connector; Fig. 4, a section on line A B of Fig. 1; Fig. 5, a section on line C D of Fig. 3; Fig. 6, a plan of a portion of the connector, showing the use of corrugations instead of holes to engage the teeth of the lever; Fig. 7, a plan of a portion of the connector, showing a modified form of adjustment of the wire; Fig. 8, a detail view of the bail; Fig. 9, a section on line E F of Fig. 1, and Fig. 10 a section of a tire with one wire.

As shown, the tire comprises an inner tube 1 and an outer casing 2. In the preferred arrangement herein illustrated double wires are used, a wire being sewed or otherwise secured in the edges of the canvas, which is usually cemented to the inner face or surface of the casing. While a single wire may be sufficient and also two connectors may be employed, the arrangement shown is preferred, in which two wires are used, only one of which has a connector.

The two ends 3 and 4 of one of the wires may be joined together by the nipple or nut 5, provided with right and left hand threads engaging corresponding screw-threads on the ends of the wire. This nut has a series of holes 6, by which it may be rotated to tighten up the wire. The wire may be suitably arranged in the edge of the usual canvas 7—as, for instance, the edge of such canvas may be turned over upon the wire and stitched, after which the usual rubber casing may be cemented upon the canvas. When the nut 5 is rotated, the wire is tightened, and this particular edge of the outer casing is held practically permanently to the rim, it being intended that access to the inner tube be had under the other edge of the casing, which is consequently provided with the wire tightener or connector about to be described. In the other edge of the canvas 7 is arranged in a similar manner the second wire, whose two ends 8 and 9 are to be connected by the connector.

The connector comprises a plate 10, having a side flange 11 and two end flanges 12 and 13. The wire 8, which passes through the flange 12, is adjustably fastened to the plate by inserting its end into the proper one of a series of longitudinally-arranged holes 14. This adjustment may also be secured, as shown in Fig. 7, by providing one end of the wire with screw-threads 15, engaged by a nut 16, bearing against the inner face of flange 12.

The side flange 11 has a series of holes 17 (or corrugations 18, as shown in Fig. 6) to receive the teeth 19 of a walking-lever 20. This lever has a flat-sided projection or large tooth 21, adapted to fit a correspondingly-sized opening 22 in the flange 11 for a purpose hereinafter mentioned.

The extreme end of wire 9 is bent at right angles and is pivotally connected to the lever 20, the wire passing through the lever and entering a longitudinal slot 23 in the plate. This pivot is shiftable or movable in such slot, so that the wire is tightened or loosened, accordingly as the lever walks in the one direction or the other.

As shown in Fig. 9, the lever is provided with a downward projection or pin 24, which is adapted to snap into a small hole or recess 25 on the plate and be engaged thereby, but not against positive force.

The bail consists of a strip or wire 26, having its ends 27 bent at right angles and adapted to loosely engage the wires 8 and 9 just outside the end flanges 12 and 13 of the plate.

As shown in Fig. 2, the edge of the casing is cut away to admit the connector proper, and the wire 26 of the bail is arranged in the edge 28 along such cut-away portion, so that the edge of the casing along practically its entire length is properly supported or carried. The bail being pivoted on the wires is adapted to be turned back, together with the casing, so as to readily expose the connector. Normally, however, this bail lies flat in the same plane as plate 10, with the wire 26 along the outer edge of the plate.

To protect the inner tube from contact with the connector or with the heads of the spokes, I prefer to use a strip 29 of canvas or other suitable material.

The operation is as follows: The casing, with its inner tube, is placed in the rim 30, and one edge of the casing tightened onto the rim by drawing together the ends 3 and 4 of the wire by turning the nut 5. When the casing was applied to the rim, the lever 20 was thrown as far to the left as possible, so that the wires 8 and 9 were loose. By turning the lever its teeth will engage the holes 17 in the plate and the lever will walk or move longitudinally, carrying the end 9 of the wire, whose extreme end will slide in slot 23. The wire will now be tightened, because its ends 8 and 9 are drawn together. The ends of the wire are in line and the pull is therefore straight. When the lever is in place upon the plate, its projecting pin 24 will engage in the small hole or recess 25 in the plate itself and be held against accidental dislodgment. When the lever is in normal position, as shown in Figs. 1 and 2, the large tooth 21 will be received by the hole 22. This tooth has a twofold function in that it not only bears the longitudinal pull or strain, but prevents the lever from springing up on account of the pull, and thus become unloosened. The proper tension is obtained by inserting the end 8 of the wire in the proper hole, or in the case of the other construction (shown in Fig. 7) by screwing up on the nut 16. After the connector is manipulated as above described the bail, with the casing thereto attached, is drawn down in place at one side of the connector, which lies flat on the crescent-shaped rim 30, with the strip 29 protecting the inner or inflatable tube from the connector and also from the usual spoke-heads. In opening the casing for obtaining access to the inner tube after being deflated, the bail, together with the casing, is turned back, thereby exposing the connector and rendering it extremely easy and convenient of manipulation. This bail thus not only forms a means for properly handling the casing so as to expose the connector, but also carries the edge of the casing when it has been cut away to accommodate the connector. This bail is shown as pivoted on the wires 8 and 9, although any manner of pivoting might be adopted and the same functions subserved.

Tires equipped with my connector are readily attachable and detachable and the use of cements for attachment to the rim is entirely avoided. Moreover, my connector is simple in construction, but reliable and positive in operation.

It is obvious that the bail may be used with other forms of connectors than my connector herein shown and described.

In Fig. 10 is illustrated a modification wherein a single wire 31 is used, which is arranged in one edge 32 of the casing 33. The other edge of such casing has a bead 34, behind which the edge 32, with its wire, engages. It is understood that the wire 31 has a connector, such as shown in Fig. 3. The manipulation of this form of tire is obvious and the same as that of the other form except that the two edges of the casing overlap and lock.

Although I have described more or less precise forms and details of construction, I do not intend to be understood as limiting myself thereto, as I contemplate changes in form, the proportion of parts, and the substitution of equivalents as circumstances may suggest or render expedient, and without departing from the spirit of my invention.

I claim—

1. In a tire, the combination with the casing having a wire in one of its edges, means for tightening and loosening the wire, the edge of the casing cut away adjacent to said means to accommodate the same and a bail arranged in the edge of such cut-away portion.

2. In combination with a tire affixed to the rim by a wire which is tightened and loosened by a connector, a pivoted bail carrying an edge of the tire adjacent to the connector.

3. In combination with the casing having a wire in one of its edges, a connector for tightening and loosening the two ends of the wire and a bail pivoted on said wire on either side of the connector and arranged in the edge of the casing adjacent to the connector.

4. In combination with the casing having a wire in one of its edges, a connector for tightening and loosening the two ends of the wire and a bail comprising a wire arranged in the edge of the casing adjacent to the connector and having angled ends pivotally mounted on said wire.

5. In combination with a tire-casing having a wire in one of its edges, of a connector or tightener for such wire comprising a plate to which one end of the wire is secured and provided with a flange having a hole, and a lever mounted on such plate and engaging the other wire, such lever having intermediate of its length a projection or tooth received by said hole.

6. In combination with a tire-casing having a wire in one of its edges, of a connector or tightener for such wire comprising a slotted plate having a side flange provided with a hole, and a lever having teeth at one end engaging said flange, one end of the wire being secured to the plate and the other end passing through the lever and received by the slot, such lever having intermediate of its length a tooth received by said hole.

7. The combination of a tire-casing having a wire in one of its edges, a connector for such wire comprising a plate having a longitudinal slot and a side flange and end flange, a lever engaging the side flange so as to walk longitudinally when turned, one end of the wire being connected to the plate and the other end to the lever and received by such slot, and a bail arranged in the edge of the casing adjacent to the connector and having right-angled ends pivotally mounted on the wire outside or beyond said end flanges.

8. The combination of a tire-casing having a wire in one of its edges, a connector for such wire comprising a plate, means on the plate for tightening or loosening the wire, the casing adjacent to the connector being cut away and a bail arranged in the edge of such cut-away portion of the casing and having angled ends pivoted onto the ends of the wire, such bail with its edge of the casing normally lying along the outer edge of the plate.

9. A tightener for the wire of a mechanically-detachable tire comprising a plate to which one end of the wire is secured, and a lever to which the other end of the wire is connected and mounted on the plate, the lever having a downwardly-extending pin or projection and a hole or recess on the plate into which such pin snaps when the lever is shifted to lie substantially longitudinally with such plate.

WALTER A. BARROWS.

Witnesses:
LOUISE E. SERAGE,
HATTIE O. HALVORSON.